(12) United States Patent
Matsumoto et al.

(10) Patent No.: US 9,919,501 B2
(45) Date of Patent: Mar. 20, 2018

(54) MANUFACTURING METHOD AND MANUFACTURING SYSTEM FOR CLEANING MEMBER

(71) Applicant: UNICHARM CORPORATION, Shikokuchuo-shi, Ehime (JP)

(72) Inventors: Takayuki Matsumoto, Kanonji (JP); Shigetomo Takahashi, Kanonji (JP); Yuji Yamashita, Kanonji (JP); Hiroaki Goto, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 14/655,939

(22) PCT Filed: Dec. 27, 2013

(86) PCT No.: PCT/JP2013/085233
§ 371 (c)(1),
(2) Date: Jun. 26, 2015

(87) PCT Pub. No.: WO2014/104351
PCT Pub. Date: Jul. 3, 2014

(65) Prior Publication Data
US 2015/0336366 A1 Nov. 26, 2015

(30) Foreign Application Priority Data

Dec. 29, 2012 (JP) .................. 2012-289184

(51) Int. Cl.
*B32B 37/00* (2006.01)
*A47L 13/00* (2006.01)
(Continued)

(52) U.S. Cl.
CPC .......... *B32B 37/0076* (2013.01); *A47L 13/38* (2013.01); *B08B 1/006* (2013.01);
(Continued)

(58) Field of Classification Search
CPC ... B32B 37/00; B32B 37/007; B32B 37/0076; B32B 37/04; A47L 13/00; A47L 13/30;
(Continued)

(56) References Cited

U.S. PATENT DOCUMENTS 345,644 A 7/1886 Moseman
470,898 A 3/1892 Reiffel
(Continued)

FOREIGN PATENT DOCUMENTS

EP 0546580 6/1993
EP 2009152 12/2008
(Continued)

OTHER PUBLICATIONS

Iwasaki, Naoki. "Mono-Directional Prepreg, Method for Manufacturing Fiber Reinforced Sheet and Apparatus for the Same." Aug. 26, 2004. Japanese Patent Office. "Detailed Description."*
(Continued)

*Primary Examiner* — Jacob T Minskey
*Assistant Examiner* — Matthew Hoover
(74) *Attorney, Agent, or Firm* — Hauptman Ham, LLP (57) ABSTRACT

A method of manufacturing a cleaning member includes a fiber bundle conveying step conveying a fiber bundle to a merging section, a nonwoven fabric conveying step conveying the nonwoven fabric strips to the merging section; a multilayer web forming step forming a multilayer web by overlaying the fiber bundle on the nonwoven fiber strips at the merging part; and a joining step joining the fiber bundle and the nonwoven fabric strips to each other in the multilayer web. In the fiber bundle conveying step, the fiber bundle is conveyed at a tension at which there is no width shrinkage in the fiber bundle, and in the multilayer web forming step, the multilayer web is formed by overlaying the
(Continued)

fiber bundle on the nonwoven strips while applying a tension that does not cause width shrinkage in the fiber bundle.

11 Claims, 4 Drawing Sheets

(51) Int. Cl.
- *B65H 20/00* (2006.01)
- *B65H 23/00* (2006.01)
- *B65H 35/00* (2006.01)
- *B65H 23/032* (2006.01)
- *B65H 23/04* (2006.01)
- *B65H 35/04* (2006.01)
- *B32B 37/04* (2006.01)
- *B08B 1/00* (2006.01)
- *A47L 13/38* (2006.01)

(52) U.S. Cl.
CPC ............ *B32B 37/04* (2013.01); *B65H 20/00* (2013.01); *B65H 23/032* (2013.01); *B65H 23/04* (2013.01); *B65H 35/04* (2013.01); *B32B 2262/00* (2013.01)

(58) Field of Classification Search
CPC  A47L 13/38; B08B 1/00; B08B 1/006; B65H 20/00; B65H 23/00; B65H 23/03; B65H 23/032; B65H 23/04; B65H 35/00; B65H 35/04
See application file for complete search history.

(56) References Cited

U.S. PATENT DOCUMENTS

| | | |
|---|---|---|
| 1,847,065 A | 2/1932 | Munch |
| 1,989,048 A | 1/1935 | Winter et al. |
| 2,733,064 A | 1/1956 | Martin |
| 2,737,688 A | 3/1956 | Jackson |
| 2,738,973 A | 3/1956 | Koch |
| 2,748,426 A | 6/1956 | Wyatt |
| 2,828,752 A | 4/1958 | Jackson |
| 2,836,418 A | 5/1958 | Blattner et al. |
| 2,904,335 A | 9/1959 | Rabinow |
| 2,926,392 A | 3/1960 | Jackson |
| 2,960,023 A | 11/1960 | Greiner et al. |
| 3,017,309 A | 1/1962 | Crawford |
| 3,022,999 A | 2/1962 | Mead |
| 3,095,343 A | 6/1963 | Berger |
| 3,120,692 A | 2/1964 | Crawford et al. |
| 3,218,675 A | 11/1965 | Hendrix |
| 3,362,707 A | 1/1968 | Lauren |
| 3,370,848 A | 2/1968 | Bartlett |
| 3,376,609 A | 4/1968 | Kalwaites |
| 3,417,560 A | 12/1968 | Watson |
| 3,468,096 A | 9/1969 | Franz |
| 3,469,285 A | 9/1969 | Garrison et al. |
| 3,566,451 A | 3/1971 | Weigand |
| 3,592,371 A | 7/1971 | Wyatt et al. |
| 3,608,024 A | 9/1971 | Yazawa et al. |
| 3,724,037 A | 4/1973 | Nicholson et al. |
| 3,737,950 A | 6/1973 | Bolliand et al. |
| 3,827,113 A | 8/1974 | Vidal et al. |
| 3,840,941 A | 10/1974 | Neveu |
| 3,860,127 A | 1/1975 | Fassman |
| 3,907,128 A | 9/1975 | Cathers |
| 3,912,258 A | 10/1975 | Martin |
| 3,996,196 A | 6/1976 | Simeth |
| 4,075,375 A | 2/1978 | Komatsu |
| 4,190,241 A | 2/1980 | Krueger |
| 4,319,744 A | 3/1982 | Nagel et al. |
| 4,385,757 A | 5/1983 | Muller |
| 4,514,128 A | 4/1985 | Hedrick |
| 4,640,161 A | 2/1987 | Kurk |
| 4,664,368 A | 5/1987 | Bouwens et al. |
| 4,817,483 A | 4/1989 | Armbruster |
| 4,961,805 A | 10/1990 | Siebert |
| 5,060,351 A | 10/1991 | Street |
| 5,060,929 A | 10/1991 | Kohlmann |
| 5,168,786 A | 12/1992 | Huggins et al. |
| 5,230,764 A | 7/1993 | Moll |
| 5,241,731 A | 9/1993 | Stuart |
| 5,243,890 A | 9/1993 | Ober |
| 5,253,762 A | 10/1993 | Duncan |
| 5,332,210 A | 7/1994 | Silverberg et al. |
| 5,355,567 A | 10/1994 | Holliday |
| 5,417,912 A | 5/1995 | Merry |
| 5,431,530 A | 7/1995 | Kobayashi et al. |
| 5,435,541 A | 7/1995 | Fornay et al. |
| 5,516,091 A | 5/1996 | Nakayama |
| 5,535,576 A | 7/1996 | Walintschek |
| 5,779,432 A | 7/1998 | Pena |
| 6,286,403 B1 | 9/2001 | Rosenthal et al. |
| 6,491,492 B1 | 12/2002 | Cook |
| 6,494,450 B2 | 12/2002 | Tsurumaki |
| 6,554,937 B1 * | 4/2003 | Kenmochi ............... A47L 13/20 15/209.1 |
| 6,572,101 B2 | 6/2003 | Kaya et al. |
| 6,585,842 B1 | 7/2003 | Bompard et al. |
| 6,743,392 B2 | 6/2004 | Tanaka et al. |
| 6,780,264 B2 | 8/2004 | Nakata et al. |
| 7,003,856 B2 | 2/2006 | Hayashi et al. |
| 7,156,011 B2 | 1/2007 | Morris et al. |
| 7,228,587 B2 * | 6/2007 | Tanaka .................... A47L 13/20 15/209.1 |
| 7,300,053 B2 | 11/2007 | Asano |
| 7,339,675 B2 | 3/2008 | Nishida et al. |
| 7,536,761 B2 | 5/2009 | Nestler et al. |
| 7,571,524 B2 | 8/2009 | Kawabe et al. |
| 8,100,038 B2 | 1/2012 | Sandahl |
| 8,201,429 B1 | 6/2012 | Matsunaga |
| 8,357,415 B2 | 1/2013 | Furusawa |
| 8,448,335 B2 | 5/2013 | Lundgren et al. |
| 2002/0026699 A1 | 3/2002 | Hayashi et al. |
| 2002/0148061 A1 | 10/2002 | Tanaka et al. |
| 2003/0000934 A1 | 1/2003 | Tanaka et al. |
| 2003/0127177 A1 | 7/2003 | Lane |
| 2003/0172506 A1 | 9/2003 | Guirman et al. |
| 2004/0149095 A1 | 8/2004 | Miyatake et al. |
| 2005/0005381 A1 | 1/2005 | Tanaka et al. |
| 2005/0039285 A1 | 2/2005 | Tanaka et al. |
| 2005/0066496 A1 | 3/2005 | Ames et al. |
| 2005/0097695 A1 | 5/2005 | Tanaka et al. |
| 2005/0097696 A1 | 5/2005 | Tanaka et al. |
| 2005/0132521 A1 | 6/2005 | Tanaka et al. |
| 2005/0139513 A1 | 6/2005 | Miller |
| 2005/0177967 A1 | 8/2005 | Tanaka et al. |
| 2005/0188490 A1 | 9/2005 | Tanaka et al. |
| 2005/0193514 A1 | 9/2005 | Tanaka et al. |
| 2005/0198760 A1 | 9/2005 | Tanaka et al. |
| 2005/0258589 A1 | 11/2005 | Michler et al. |
| 2006/0005675 A1 | 1/2006 | Scheffer et al. |
| 2006/0016035 A1 | 1/2006 | Tanaka et al. |
| 2006/0016036 A1 | 1/2006 | Tanaka et al. |
| 2006/0048325 A1 | 3/2006 | Tsuchiya |
| 2006/0051434 A1 | 3/2006 | Tsuchiya |
| 2006/0101601 A1 | 5/2006 | Fujiwara et al. |
| 2006/0156876 A1 | 7/2006 | Sussmeier et al. |
| 2006/0179989 A1 | 8/2006 | James et al. |
| 2007/0068353 A1 | 3/2007 | Piucci et al. |
| 2007/0101564 A1 | 5/2007 | Nestler et al. |
| 2008/0047087 A1 | 2/2008 | Levy et al. |
| 2009/0049633 A1 | 2/2009 | Takabayashi et al. |
| 2009/0165230 A1 | 7/2009 | Tsuchiya et al. |
| 2009/0169830 A1 | 7/2009 | Yamada |
| 2009/0172904 A1 | 7/2009 | Tsuchiya et al. |
| 2009/0196538 A1 | 8/2009 | Liou et al. |
| 2009/0255078 A1 | 10/2009 | Wada et al. |
| 2010/0000382 A1 | 1/2010 | Maddalon |
| 2010/0015383 A1 * | 1/2010 | Yamada ................... A47L 13/16 428/91 |
| 2010/0022978 A1 | 1/2010 | Kasai et al. |
| 2010/0058907 A1 | 3/2010 | Kern |
| 2010/0122613 A1 | 5/2010 | Sandahl |

(56) References Cited

U.S. PATENT DOCUMENTS

| | | |
|---|---|---|
| 2010/0154156 A1 | 6/2010 | Takabayashi et al. |
| 2010/0180745 A1 | 7/2010 | Hall |
| 2011/0088189 A1 | 4/2011 | Wada et al. |
| 2011/0138942 A1 | 6/2011 | Murata |
| 2011/0296965 A1 | 12/2011 | Manek-Honninger et al. |
| 2012/0102678 A1 | 5/2012 | Junker et al. |
| 2012/0132046 A1 | 5/2012 | Supe-Dienes |
| 2012/0135227 A1 | 5/2012 | Kawabe |
| 2012/0167736 A1 | 7/2012 | Yokoe |
| 2014/0182429 A1 | 7/2014 | Saito et al. |
| 2014/0187406 A1* | 7/2014 | Matsumoto ............. B08B 1/006 493/374 |

FOREIGN PATENT DOCUMENTS

| | | |
|---|---|---|
| JP | 45-35382 | 11/1970 |
| JP | 48-89917 | 10/1973 |
| JP | 56-169873 | 12/1981 |
| JP | 61-105364 U | 7/1986 |
| JP | 3-33222 | 2/1991 |
| JP | 4-289100 A | 10/1992 |
| JP | 5-20896 U | 3/1993 |
| JP | 5-279950 | 10/1993 |
| JP | 5-316909 | 12/1993 |
| JP | 6-297386 A | 10/1994 |
| JP | 8-49126 | 2/1996 |
| JP | 9-111644 | 4/1997 |
| JP | 9-111644 A | 4/1997 |
| JP | 10-110346 | 4/1998 |
| JP | 10-266012 A | 10/1998 |
| JP | 11-323718 | 11/1999 |
| JP | 2000-296083 | 10/2000 |
| JP | 2001-246595 | 9/2001 |
| JP | 2001-288639 | 10/2001 |
| JP | 2002-66991 A | 3/2002 |
| JP | 2002-069781 | 3/2002 |
| JP | 2003-265390 | 9/2003 |
| JP | 2003-268663 | 9/2003 |
| JP | 2003-293236 | 10/2003 |
| JP | 2004-223692 | 8/2004 |
| JP | 2004-238615 | 8/2004 |
| JP | 2004-238615 A | 8/2004 |
| JP | 2004238615 * | 8/2004 |
| JP | 2005-040641 | 2/2005 |
| JP | 2005-046645 | 2/2005 |
| JP | 2005-111284 | 4/2005 |
| JP | 2005-137929 | 6/2005 |
| JP | 2005-137930 | 6/2005 |
| JP | 2005-137931 | 6/2005 |
| JP | 2005-144198 | 6/2005 |
| JP | 2005-169148 | 6/2005 |
| JP | 2005-237975 | 9/2005 |
| JP | 2006-015164 | 1/2006 |
| JP | 2006-034990 | 2/2006 |
| JP | 2006-141483 | 6/2006 |
| JP | 2006-152485 | 6/2006 |
| JP | 2006-166931 | 6/2006 |
| JP | 2006-265762 | 10/2006 |
| JP | 2007-002390 | 1/2007 |
| JP | 2007-029135 | 2/2007 |
| JP | 2007-111297 | 5/2007 |
| JP | 2007-126810 | 5/2007 |
| JP | 2007-135666 | 6/2007 |
| JP | 2007-135774 | 6/2007 |
| JP | 2007-136156 | 6/2007 |
| JP | 2007-159612 | 6/2007 |
| JP | 2007-209460 | 8/2007 |
| JP | 2007-283086 | 11/2007 |
| JP | 2008-6260 | 1/2008 |
| JP | 2008-119171 | 5/2008 |
| JP | 2008-125603 | 6/2008 |
| JP | 2008-125603 A | 6/2008 |
| JP | 2009-153914 | 7/2009 |
| JP | 2009-254536 A | 11/2009 |
| JP | 2010-24575 | 2/2010 |
| JP | 2011-062802 | 3/2011 |
| JP | 2011-084313 | 4/2011 |
| JP | 2011-94701 A | 5/2011 |
| JP | 4738311 | 8/2011 |
| JP | 2012-115783 | 6/2012 |
| KR | 20110137660 | 12/2011 |
| WO | 2007/023965 | 3/2007 |
| WO | 2008/099733 A1 | 8/2008 |

OTHER PUBLICATIONS

International Search Report and Written Opinion dated Feb. 18, 2014, corresponds to International Application No. PCT/JP2013/085203.

International Search Report and Written Opinion dated Mar. 25, 2014, corresponds to International Application No. PCT/JP2013/085170.

International Search Report and Written Opinion dated Feb. 18, 2014, corresponds to Internation Application No. PCT/JP2013/085179.

Office Action dated Apr. 29, 2015, corresponding to U.S. Appl. No. 13/749,717.

Office Action dated Apr. 27, 2015, corresponding to U.S. Appl. No. 13/749,726.

International Search Report dated Mar. 25, 2014, corresponds to International Application No. PCT/JP2013/085172.

International Search Report dated Mar. 18, 2014, corresponds to International Application No. PCT/JP2013/085177.

International Search Report dated Apr. 1, 2014, corresponds to International Application No. PCT/JP2013/085233.

* cited by examiner

MANUFACTURING METHOD AND MANUFACTURING SYSTEM FOR CLEANING MEMBER

RELATED APPLICATIONS

The present application is a National Phase of International Application Number PCT/JP2013/085233, filed Dec. 27, 2013, which claims priority to Japanese Application Number 2012-289184, filed Dec. 29, 2012.

TECHNICAL FIELD

The present invention relates to a method of producing a cleaning member and to a production system for producing a cleaning member.

BACKGROUND ART

Various types of cleaning members which can trap dirt, dust, refuse and the like have been known in the past, and methods of producing these various types of cleaning members have been actively studied from various viewpoints in recent years.

For example, in PTL 1, there is proposed a method for production of a cleaning-use article provided with a step of overlaying a belt-shaped inside fiber layer which is comprised of a continuous fiber bundle with a belt-shaped sheet member and partially joining the two to form a first web, similarly forming a second web, overlaying these first and second webs and partially fastening them, then overlaying and fastening belt-shaped outside fiber layers which are comprised of continuous fiber bundles on the inside fiber layer sides of the first and second webs, a step of cutting the laminate obtained in the above step into predetermined lengths, and a step of treating the fiber layer parts of the cut laminate with compressed air to make the fiber bundles open, and in this method for production of a cleaning-use article, the belt-shaped inside fiber layers and outside fiber layers are respectively comprised of fiber bundles which are in turn comprised of crimped fibers bent in zigzag shapes, the difference in height between the alternating peaks and valleys in the crimped fibers being 0.1 to 0.7 mm, and, in the step of opening the fiber bundles, the fiber bundles of the cut laminate are raised so that the entire circumference of the cleaning-use article is covered by the tips of the bristles comprised of fibers of the fiber bundles.

Further, in PTL 2 for example, there is proposed a method for production of a cleaning-use article comprising producing a first web having a first fiber layer comprised of a continuous fiber bundle and having a first belt-shaped member, the two side sections of the first belt-shaped member in the lengthwise direction being folded and fastened, the first fiber layer being overlaid and fastened to the outer surface side of the first belt-shaped member, and a second web having a second fiber layer comprised of a continuous fiber bundle and having a second belt-shaped member, the two side sections of second belt-shaped member in the lengthwise direction being folded and fastened, the second fiber layer being overlaid and fastened to the outer surface side of the second belt-shaped member, overlaying and joining the produced first web and second web, then respectively overlaying and fastening a third fiber layer and fourth fiber layer comprised of continuous fiber bundles on the first fiber layer and the second fiber layer to form a laminate, and cutting the formed laminate to obtain individual cleaning-use articles, the method for production of a cleaning-use article having a step of intermittently forming, in the first belt-shaped member and the second belt-shaped member respectively, cutting guide lines across entire regions in the widthwise directions of the first belt-shaped member and the second belt-shaped member, so that there are formed in the first belt-shaped member and the second belt-shaped member a center section which is sandwiched between a pair of cutting guide lines and outer sections which are connected to the center section through the cutting guide lines, a step of joining the first fiber layer and the second fiber layer to the first belt-shaped member and the second belt-shaped member after formation of the cutting guide lines by center continuous seal lines across entire regions in the widthwise directions of the first fiber layer and the second fiber layer so as to produce the first web and the second web, a step of overlaying the first web and the second web and joining them by discontinuous side seals across the widthwise directions of the first fiber layer and the second fiber layer, a step of further overlaying and fastening a third fiber layer and a fourth fiber layer on the first fiber layer of the first web and the second fiber layer on the second web to form the laminate, a step of cutting off the outer sections located at both sides of the center sections, from the cut first belt-shaped member and second belt-shaped member, respectively, after cutting of the laminate, while leaving the center sections sandwiched by the pairs of cutting guide lines, and a step of opening the cut first to fourth fiber layers, after cutting of the laminate, to form random piles in three dimensions.

Also, for example, in PTL 3, there is provided a method for production of a cleaning-use article as set forth in claim 1, the method for production of a cleaning-use article comprising laminating four webs of long-shaped fiber layers comprised of fiber bundles oriented in a single direction, two webs of long-shaped scraping sheets, and two webs of long continuous substrate sheets in the order: fiber layer web, scraping sheet web, fiber layer web, two substrate sheet webs, fiber layer web, scraping sheet web and fiber layer web, bonding the webs at predetermined intervals across the widthwise direction to prepare a cleaning-use article web, and then cutting the cleaning-use article web between the bonded sections of the fiber layer webs, the substrate sheet webs and the scraping sheet webs across the widthwise direction to obtain a plurality of the cleaning-use articles.

CITATION LIST

Patent Literature

[PTL 1] Japanese Patent Publication No. 4878988
[PTL 2] Japanese Patent Publication No. 4738311
[PTL 3] Japanese Patent Publication No. 4675218

SUMMARY OF THE INVENTION

Technical Problem

However, a desire currently exists for a novel method of production and a novel system of production for producing a cleaning member which can efficiently trap dirt, dust, refuse and the like. The present invention was discovered in light of this situation, as a result of in-depth studies by the inventors.

Specifically, the present invention has as its object the provision of a novel method of production and system of production which are suitable for production of a cleaning member with excellent cleaning performance, and also allow efficient production.

Solution to Problems

In order to solve the problems mentioned above, the method of producing a cleaning member according to the invention is a method of producing a cleaning member that is obtained from a multilayer web formed by overlaying a fiber bundle and a belt-shaped nonwoven fabric, the method being comprised of a fiber bundle conveying step wherein the fiber bundle is continuously conveyed toward a merging section where it is to be overlaid with the belt-shaped nonwoven fabric, a nonwoven fabric conveying step wherein the belt-shaped nonwoven fabric is continuously conveyed toward the merging section, a multilayer web forming step wherein the fiber bundle that has been conveyed in the fiber bundle conveying step and the belt-shaped nonwoven fabric that has been conveyed in the nonwoven fabric conveying step are overlaid at the merging section to form a multilayer web, and a joining step wherein the fiber bundle and the belt-shaped nonwoven fabric in the multilayer web are mutually joined, wherein in the fiber bundle conveying step, the fiber bundle is conveyed with a degree of tension such that the fiber bundle does not narrow, and in the multilayer web forming step, the multilayer web is formed by overlaying with the belt-shaped nonwoven fabric in that state of tension acting to such a degree that the fiber bundle does not narrow.

Also in order to solve the problems mentioned above, the system for producing a cleaning member according to the invention is a system that produces a cleaning member from a multilayer web formed by overlaying a fiber bundle and a belt-shaped nonwoven fabric, the system being comprised of a fiber bundle conveying apparatus that continuously conveys the fiber bundle toward a merging section where it is to be overlaid with the belt-shaped nonwoven fabric, a nonwoven fabric conveying apparatus that continuously conveys the belt-shaped nonwoven fabric toward the merging section, a multilayer web forming apparatus that overlays the fiber bundle that has been conveyed by the fiber bundle conveying apparatus and the belt-shaped nonwoven fabric that has been conveyed by the nonwoven fabric conveying apparatus at the merging section to form a multilayer web, and a joining apparatus that mutually joins the fiber bundle and the belt-shaped nonwoven fabric in the multilayer web, wherein the fiber bundle conveying apparatus conveys the fiber bundle with a degree of tension such that the fiber bundle does not narrow, and the multilayer web forming apparatus forms the multilayer web by overlaying the fiber bundle and the belt-shaped nonwoven fabric in that state of tension acting to such a degree that the fiber bundle does not narrow.

Advantageous Effects of Invention

According to the present invention, there are provided a novel production method and production system which are suitable for production of a cleaning member with excellent cleaning performance and which also allow efficient production.

DESCRIPTION OF EMBODIMENTS

[Method of Producing Cleaning Member]

A method of producing a cleaning member according to the present invention will now be explained in detail.

The method of producing a cleaning member according to the invention is a method of producing a cleaning member that is obtained from a multilayer web formed by overlaying a fiber bundle and a belt-shaped nonwoven fabric, the method being comprised of a fiber bundle conveying step wherein the fiber bundle is continuously conveyed toward a merging section where it is to be overlaid with the belt-shaped nonwoven fabric, a nonwoven fabric conveying step wherein the belt-shaped nonwoven fabric is continuously conveyed toward the merging section, a multilayer web forming step wherein the fiber bundle that has been conveyed in the fiber bundle conveying step and the belt-shaped nonwoven fabric that has been conveyed in the nonwoven fabric conveying step are overlaid at the merging section to form a multilayer web, and a joining step wherein the fiber bundle and the belt-shaped nonwoven fabric in the multilayer web are mutually joined.

Moreover, in the fiber bundle conveying step, the fiber bundle is conveyed with a degree of tension such that the fiber bundle does not narrow, and in the multilayer web forming step, the multilayer web is formed by overlaying with the belt-shaped nonwoven fabric in that state of tension acting to such a degree that the fiber bundle does not narrow (Aspect 1).

The term "narrow" as used herein means that the object being conveyed, such as a fiber bundle, belt-shaped nonwoven fabric or multilayer web, reduces in size in the direction perpendicular to the machine direction i.e. reduces in size in the widthwise direction, by being pulled in the machine direction (the lengthwise direction).

The method of producing a cleaning member according to the invention is a novel production method which is suitable for production of a cleaning member with excellent cleaning performance, and which also allows efficient production.

In the fiber bundle conveying step of the method of producing a cleaning member of the invention, the fiber bundle is conveyed with a degree of tension such that the fiber bundle does not narrow, while in the multilayer web forming step, the multilayer web is formed by overlaying with the belt-shaped nonwoven fabric in that state of tension acting to such a degree that the fiber bundle does not narrow.

This will inhibit the fiber bundles forming the multilayer web from significantly shrinking or crimping by restorative recoil from narrowing, even when the tension on the multilayer web has been released after the joining step, thereby avoiding any major changes in length. It will therefore be easy to control the lengths of the fiber bundles during production of the cleaning member, and the lengths of the fiber bundles may be adjusted to the desired lengths with respect to the length (width) of the nonwoven fabric.

Furthermore, the fiber bundle becomes resistant to breakage during conveyance or during overlay with the belt-shaped nonwoven fabric, while it is also resistant to breakage (breakage by melting) when it is melt bonded, for example, during joining between the fiber bundle and the belt-shaped nonwoven fabric, so that the high-speed productivity is excellent.

In the fiber bundle conveying step of Aspect 1, preferably the fiber bundle is conveyed while being relaxed in the machine direction (lengthwise direction) (Aspect 2). As a result, the fiber bundle in the fiber bundle conveying step will only be subjected to the tension produced by its own weight, at times other than when the fiber bundle is being transported in the machine direction, and therefore as regards the length of the fiber bundle in its widthwise direction, it will be possible to stably maintain an essentially constant widthwise direction length without narrowing. In addition, excessive opening of the fiber bundles by tension will be avoided. Furthermore, although pulling tension acts in the machine direction of the fiber bundle when the fiber bundle is transported in the machine direction, nevertheless even in this case the tension acting on the fiber bundle is not enough to narrow the fiber bundle, and therefore narrowing of the fiber bundle can be minimized during that time as well.

In the fiber bundle transport step of Aspect 1 or Aspect 2 in which the fiber bundle is conveyed, the fiber bundle is preferably conveyed in a substantially straight manner (Aspect 3). According to the Aspect 3, a cleaning member can be obtained with high-speed productivity and the cleaning member can be efficiently produced. Here, reference to conveyance of the fiber bundle in a substantially straight manner means that the fiber bundle is conveyed with minimal snaking.

In this case, in order to convey the fiber bundle without snaking, a certain degree of tension is allowed to act on the fiber bundle when the fiber bundle is transported in the machine direction. Since, according to the invention, the tension acting on the fiber bundle is basically such that the fiber bundle does not narrow, the fiber bundle is suitably pulled in a straight manner in the machine direction when the fiber bundle is transported in the machine direction, and the fiber bundle can thus be conveyed linearly while minimizing snaking.

In the nonwoven fabric conveying step in which the belt-shaped nonwoven fabric is conveyed according to all of Aspects 1 to 3, the belt-shaped nonwoven fabric is preferably conveyed in a substantially straight manner (Aspect 4). According to the Aspect 4, a cleaning member can be obtained with high-speed productivity and the cleaning member can be efficiently produced. Here, the reference to conveyance of the belt-shaped nonwoven fabric in a substantially straight manner means that the belt-shaped nonwoven fabric is conveyed to an extent such that no snaking of the belt-shaped nonwoven fabric takes place.

In order to prevent the belt-shaped nonwoven fabric from snaking in the nonwoven fabric conveying step, preferably the belt-shaped nonwoven fabric is conveyed while applying a certain degree of tension on the belt-shaped nonwoven fabric; for example, a degree of tension such that the belt-shaped nonwoven fabric does not narrow.

According to all of Aspects 1 to 4, in the fiber bundle transport step, the fiber bundle is conveyed with a substantially constant length in the widthwise direction of the fiber bundle (Aspect 5).

As mentioned above, since in the fiber bundle transport step according to the invention, the fiber bundle is conveyed with a degree of tension such that the fiber bundle does not narrow, there is no narrowing of the fiber bundle in the fiber bundle transport step and it is possible to convey the fiber bundle while maintaining a substantially constant widthwise direction length at all times. This will keep to a minimum any further opening of the fiber bundle due to the action of excessive tension during the fiber bundle transport step, and will facilitate management of the fiber bundle lengths and the condition of piles, as well as management of the dimensions of the multilayer web as a whole.

According to all of Aspects 1 to 5, in the nonwoven fabric conveying step in which the belt-shaped nonwoven fabric is conveyed, preferably the belt-shaped nonwoven fabric is conveyed with a substantially constant length in the widthwise direction of the belt-shaped nonwoven fabric (Aspect 6). Here, reference to a substantially constant length in the widthwise direction of the belt-shaped nonwoven fabric means that the length of the belt-shaped nonwoven fabric in the widthwise direction is not reduced, i.e. narrowed, by tension of the belt-shaped nonwoven fabric.

When narrowing is produced by tension in the machine direction of the belt-shaped nonwoven fabric, release of tension on the belt-shaped nonwoven fabric during the subsequent step eliminates narrowing of the belt-shaped nonwoven fabric and can potentially result in a significant change in the widthwise direction length and machine direction (lengthwise direction) length, and therefore control and management of the dimensions of the belt-shaped nonwoven fabric becomes difficult. Therefore, since narrowing does not take place in the belt-shaped nonwoven fabric according to Aspect 6, change in the length in the machine direction and the length in the widthwise direction is low even after the tension has been released, thereby facilitating control and management of the dimensions of the belt-shaped nonwoven fabric and management of the dimensions of the multilayer web as a whole.

According to all of Aspects 1 to 5, in the joining step in which the fiber bundle and the belt-shaped nonwoven fabric in the multilayer web are mutually joined, preferably the fiber bundle and the belt-shaped nonwoven fabric are mutually joined by melt bonding (Aspect 7). According to another embodiment, the joining is accomplished by hot-melting.

According to all of Aspects 1 to 7, preferably the fiber bundle is an opened fiber bundle (Aspect 8). If the fiber bundle is thus opened, the fibers of the fiber bundle will become crimped and raised, causing the fiber bundle as a whole to be spread out in a soft flocculent state, thus allowing dust to be easily incorporated into the fibers when it is employed as a cleaning member. Furthermore, since the fibers can flexibly contact the object to be cleaned, they do not damage the object to be cleaned even when the cleaning member is pressed against it, and the fibers can infiltrate up to the narrow sections of floors and the corner sections of furniture, where dust is difficult to remove, thus allowing the dust to be taken up.

Since opened fiber bundles are used during production of the cleaning member, the invention may include an opening step before the fiber bundle transport step, wherein the fiber bundle to be used for production of the fiber member is opened. Specifically, there may be used means that repeats application of tension and relaxation, or blowing of air, on the fiber bundle to be opened in the machine direction.

According to all of Aspects 1 to 8 there is preferably further included, after the joining step, a cutting step in which the multilayer web is cut in the widthwise direction (Aspect 9).

In the method of producing a cleaning member according to the present invention, two or more of Aspects 1 to 9 may be combined.

[System of Producing Cleaning Member]

A system of producing a cleaning member according to the present invention will now be explained in detail.

The system of producing a cleaning member according to the invention is a system for producing a cleaning member from a multilayer web formed by overlaying a fiber bundle and a belt-shaped nonwoven fabric, the system comprising a fiber bundle conveying apparatus that continuously conveys the fiber bundle toward a merging section where it is to be overlaid with the belt-shaped nonwoven fabric, and a nonwoven fabric conveying apparatus that continuously conveys the belt-shaped nonwoven fabric toward the merging section. In addition, it comprises a multilayer web forming apparatus that overlays the fiber bundles conveyed by the fiber bundle conveying apparatus and the belt-shaped nonwoven fabric conveyed by the nonwoven fabric conveying apparatus, at the merging section, to form a multilayer web, and a joining apparatus that mutually joins the fiber bundle and the belt-shaped nonwoven fabric in the multilayer web. Moreover, the fiber bundle conveying apparatus allows conveying of the fiber bundle with a tension such that the fiber bundle does not narrow, while the multilayer web forming apparatus has a construction allowing formation of a multilayer web by overlaying with the belt-shaped nonwoven fabric while applying tension to a degree such that the fiber bundle does not narrow (Aspect 10).

The system for producing a cleaning member according to the present invention is a system which is suitable for producing a cleaning member with excellent cleaning performance and which further enables efficient production.

In the system for producing a cleaning member according to the present invention, the fiber bundle conveying apparatus that continuously conveys the fiber bundle toward the merging section, where it is to be overlaid with the belt-shaped nonwoven fabric, is able to convey the fiber bundle with a degree of tension such that the fiber bundle does not narrow. Furthermore, the multilayer web forming apparatus that forms the multilayer web by overlaying the fiber bundle conveyed by the fiber bundle conveying apparatus and the belt-shaped nonwoven fabric conveyed by the nonwoven fabric conveying apparatus, at the merging section, is able to form the multilayer web by overlaying with the belt-shaped nonwoven fabric while applying a degree of tension to the fiber bundle such that it does not narrow.

This will inhibit the fiber bundles forming the multilayer web from significantly shrinking or crimping even when the tension on the multilayer web has been released after joining of the fiber bundle and the belt-shaped nonwoven fabric by the joining apparatus, to avoid any major changes in length.

It will therefore be easy to control the lengths of the fiber bundles during production of the cleaning member, and the lengths of the fiber bundles may be adjusted to the desired lengths with respect to the length (width) of the nonwoven fabric.

Also, the fiber bundle will be resistant to breakage during conveying when it is overlaid with the belt-shaped nonwoven fabric at the multilayer web forming apparatus, while it will also be resistant to breakage (breakage by melting) when it is melt bonded, for example, when the fiber bundle and belt-shaped nonwoven fabric are joined by the joining apparatus, thereby resulting in excellent high-speed productivity.

The fiber bundle conveying apparatus of Aspect 10 is preferably able to convey the fiber bundle while relaxing it in the lengthwise direction (Aspect 11). As a result, the fiber bundle conveyed by the fiber bundle conveying apparatus will only be subjected to the tension produced by its own weight, at times other than when the fiber bundle is not being transported in the machine direction, and therefore as regards the length of the fiber bundle in its widthwise direction, it will be possible to stably maintain an essentially constant widthwise direction length without narrowing. In addition, excessive opening of the fiber bundles by tension will be avoided. Furthermore, when the fiber bundle is transported in the machine direction, pulling tension must be applied in the machine direction of the fiber bundle, but even in this case the tension applied to the fiber bundle is not enough to narrow the fiber bundle, and therefore narrowing of the fiber bundle is minimized during that time as well.

Also, in Aspect 10 or Aspect 11, the system is preferably further provided with a cutting apparatus which cuts the multilayer web in the widthwise direction (Aspect 12).

The system for producing a cleaning member according to the present invention may be provided with an apparatus for opening fiber bundles so as to open the fiber bundles.

In the system for producing a cleaning member according to the present invention, Aspects 10 to 12 can be combined.

Embodiments of a method of producing and a system of producing a cleaning member according to the invention will now be explained in further detail based on FIG. 1 to FIG. 5. It is to be noted that the method and system for producing a cleaning member according to the present invention are not limited to the embodiments of the invention shown in FIG. 1 to FIG. 5, so long as they are within the scope of the object and gist of the invention.

First, the cleaning member 1 will be explained based on FIG. 1 to FIG. 3.

Figure 1:
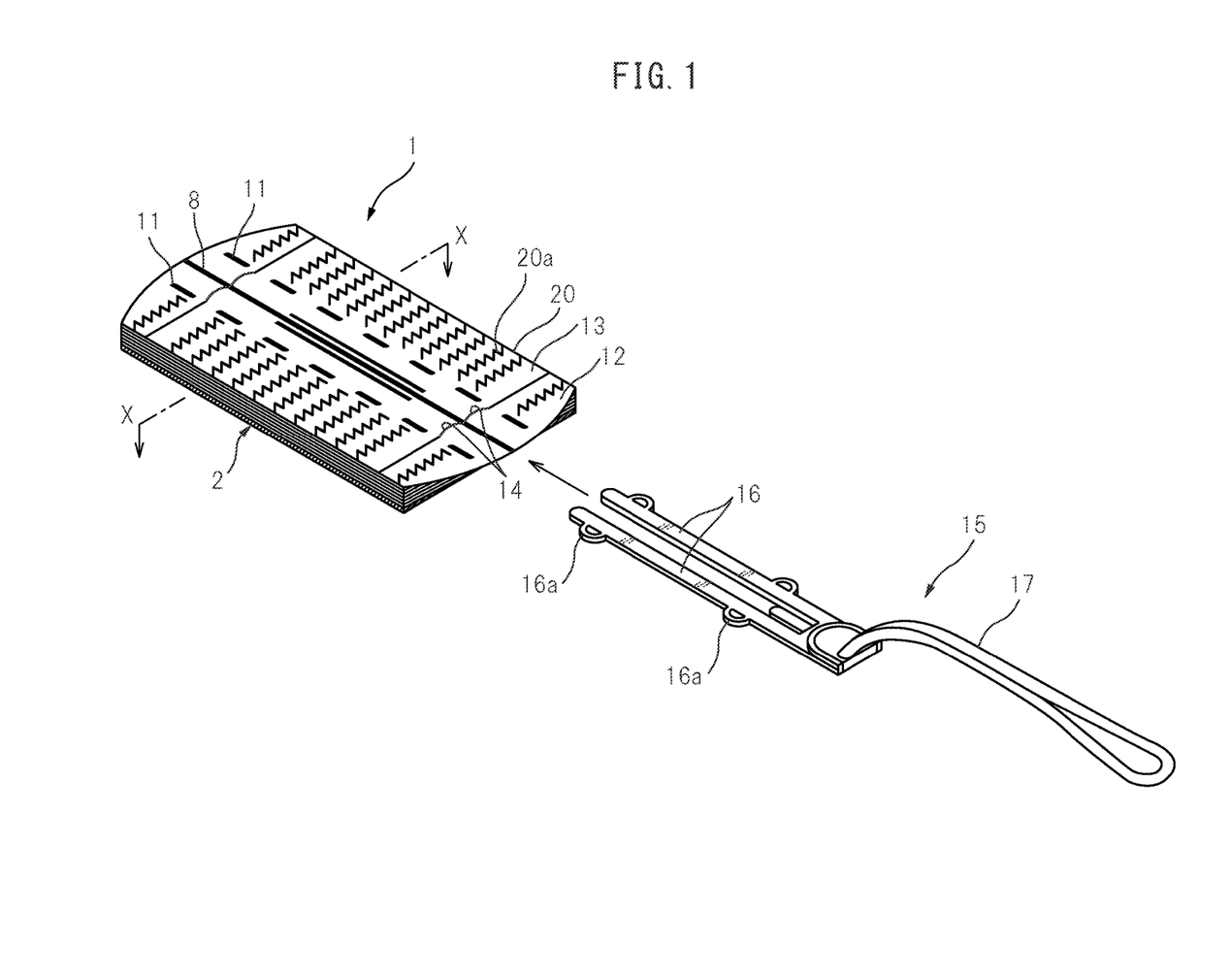
FIG. 1 is a perspective view of a cleaning member produced by an embodiment of the production method and/or production system of the present invention, and a handle which is fastened to the cleaning member.
Figure 2:
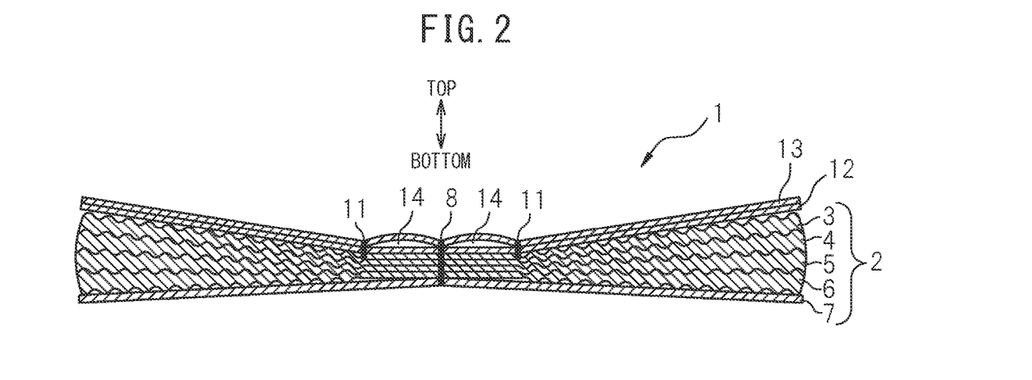
FIG. 2 is a cross-sectional view along line X-X of FIG. 1.
Figure 3:
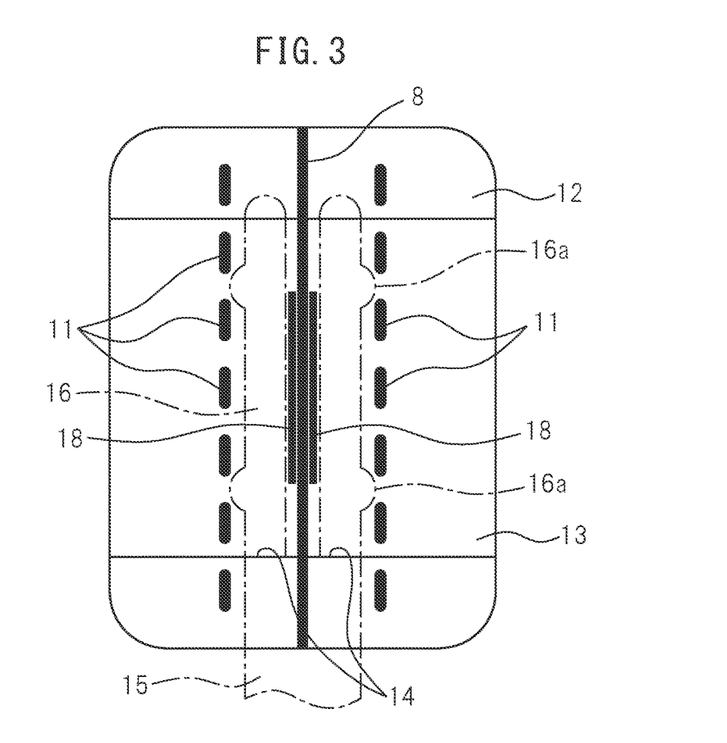
FIG. 3 is a plan view of the cleaning member shown in FIG. 1.

FIG. 1 is a perspective view of a cleaning member 1 and a handle 15 which is fastened to the cleaning member 1, FIG. 2 is a cross-sectional view along line X-X of FIG. 1, and FIG. 3 is a plan view of the cleaning member 1 shown in FIG. 1. In the following explanation, "top" in FIG. 2 means the top side and "bottom" means the bottom side in some cases, but the terms "top" and "bottom" in FIG. 2 are merely used for convenience of explanation, and the up-down directions of the cleaning member 1 are not so limited.

As shown in FIG. 1 to FIG. 3, the cleaning member 1 is provided with a brush sheet 2, a substrate sheet 12 which is laid on the top side of the brush sheet 2, and a holding sheet 13 which is laid on the top side of the substrate sheet 12.

As shown in FIG. 1 to FIG. 3, the cleaning member 1 is formed with receiving parts 14 for insertion of insert parts 16 of the handle 15 between the substrate sheet 12 and the holding sheet 13. As shown in FIG. 1 to FIG. 3, the cleaning member 1 is formed with two receiving parts 14 and enables insertion of two branched insert parts 16. There are two receiving parts 14 for the present embodiment, but the number of receiving parts 14 can be suitably changed in accordance with the number of branched insert parts 16. As another embodiment there may be mentioned an embodiment in which there are three or more receiving parts 14.

As shown in FIG. 2, the brush sheet 2 is provided with a four-layer structure fibrous member which is comprised of a first fibrous member 3, a second fibrous member 4 which is overlaid on the bottom side of the first fibrous member 3, a third fibrous member 5 which is overlaid on the bottom side of the second fibrous member 4, and a fourth fibrous member 6 which is overlaid on the bottom side of the third fibrous member 5, and a sheet with slits 7 which is overlaid on the bottom side of this four-layer structure fibrous member (the bottom side of the fourth fibrous member 6). The fibrous member of the brush sheet 2 in the present embodiment is a four-layer structure, but the layer structure of the fibrous member may be changed as appropriate. As other embodiments there may be mentioned embodiments in which the layered structure of the fibrous member is a single-layer structure, two-layer structure, or three-layer structure, and as yet other embodiments there may be mentioned embodiments in which the layered structure of the fibrous member is a structure of five or more layers. Further, although the brush sheet 2 in the present embodiment is provided with a sheet with slits 7, the presence or absence of the sheet with slits 7 may be selected as appropriate. As another embodiment there may be mentioned an embodiment without the sheet with slits 7.

The first to fourth fibrous members 3 to 6 are oiled fiber bundles, the oil being a dust-catching oil which has the action of promoting adsorption of dust, dirt and the like (for example, an oil mainly comprised of liquid paraffin).

The fiber bundle is, for example, a tow, and preferably an opened tow. The term "tow" is described in JIS L 0204-3: 1998, section 3.1.24, and means a bundle of an extremely large number of filaments aligned together.

The fiber bundle may also be a bundle of slit fibers (fibers obtained by cutting and stretching a film in an elongated manner), split fibers (fibers obtained by fragmenting an elongated film into a net structure), or the like.

Also, as the fiber bundle there may be mentioned, for example, a fiber bundle comprised of thermoplastic fibers, a fiber bundle including thermoplastic fibers, or the like.

As the material of the fibers forming the fiber bundle there may be mentioned, for example, polyethylene, polypropylene, polyethylene terephthalate, nylon, rayon and the like, and as the type of the fibers forming the fiber bundle there may be mentioned, for example, monofilaments, composite fibers (for example, core-sheath composite fibers or side-by-side composite fibers) and the like. The composite fibers, from the viewpoint of thermal bondability, are preferably core-sheath composite fibers, and more preferably core-sheath composite fibers in which the melting point of the core is higher than the melting point of the sheath.

Examples of preferred core-sheath composite fibers include core-sheath composite fibers with a core comprised of polypropylene or polyethylene terephthalate and a sheath comprised of polyethylene, and examples of more preferred core-sheath composite fibers include core-sheath composite fibers with a core comprised of polyethylene terephthalate and a sheath comprised of polyethylene.

The denier of the fibers forming the fiber bundle is preferably 1 to 50 dtex and more preferably 2 to 10 dtex. The fiber bundle may include a plurality of different types of fibers with the same denier or it may include one or more types of fibers with different deniers.

In this embodiment, the fibers which form the fiber bundle are comprised of crimped fibers. By forming the fibers with crimped fibers, it is possible to increase the bulk of the fiber bundle and to produce a structure in the crimped parts that allows dust, dirt and the like to be easily taken up. As another embodiment there may be mentioned an embodiment where the fibers which form the fiber bundle are comprised of non-crimped fibers.

The sheet with slits 7, as explained below, similar to the substrate sheet 12 and holding sheet 13, is formed from a nonwoven fabric which is comprised of thermoplastic fibers (heat bondable fibers) or a nonwoven fabric which includes thermoplastic fibers and is formed into a rectangular shape of substantially the same width and substantially the same length as the substrate sheet 12. The sheet with slits 7 is provided with sawtooth shaped slits (not shown) at predetermined intervals across the entire sheet with slits 7, and due to the slits, both edges have sawtooth shaped strips (not shown) across the entire length on both edge sections in the widthwise direction of the sheet with slits 7.

As shown in FIG. 1 to FIG. 3, at the top side of the first fibrous member 3 of the brush sheet 2, the substrate sheet 12 and the holding sheet 13 are overlaid in that order, while between the substrate sheet 12 and the holding sheet 13 there are formed receiving parts 14 for insertion of insert parts 16 of the handle 15.

As shown in FIG. 3, the substrate sheet 12 and the holding sheet 13 have rectangular shapes, and the two sheets 12 and 13 are set to the same dimensions in the widthwise direction (the left-right direction of FIG. 3), while the substrate sheet 12 is set to have a longer dimension in the lengthwise direction (the up-down direction of FIG. 3). Also, the holding sheet 13 is overlaid on the top side of the substrate sheet 12 so that the two ends of the substrate sheet 12 in the lengthwise direction protrude outward from the two ends in the lengthwise direction of the holding sheet 13, by predetermined lengths.

The substrate sheet 12 and holding sheet 13 are formed from nonwoven fabrics which are comprised of thermoplastic fibers (heat bondable fibers) or nonwoven fabrics which include thermoplastic fibers.

Examples of thermoplastic fibers include polyethylene fibers, polypropylene fibers, polyethylene terephthalate fibers, polyethylene and polyethylene terephthalate composite fibers, polyethylene and polypropylene composite fibers, core-sheath composite fibers comprised of, for example, a core comprised of polyethylene terephthalate and a sheath comprised of polyethylene, and the like. Examples of nonwoven fabric types include thermal bond nonwoven fabrics, spunbonded nonwoven fabrics, spunlace nonwoven fabrics and the like.

Other embodiments include embodiments in which the substrate sheet and the holding sheet are formed from thermoplastic resin films, for example, polyethylene films and polypropylene films, and further embodiments include embodiments in which the substrate sheet and the holding sheet are formed from laminate sheets of nonwoven fabrics and resin films.

The substrate sheet 12 and the holding sheet 13 are integrally melt bonded by a first melt bonded section-forming device 158, described below, together with all of the layers of the brush sheet 2 (first fibrous member 3, second fibrous member 4, third fibrous member 5, fourth fibrous member 6, and sheet with slits 7), whereby the cleaning member 1, as shown in FIG. 1 to FIG. 3, is formed with a first melt bonded section 8 extending in the lengthwise direction at the center section in the widthwise direction.

Furthermore, the substrate sheet 12 and the holding sheet 13 are integrally melt bonded with one layer of the brush sheet 2 (first fibrous member 3) on both sides of the first melt bonded section 8 (left and right in FIG. 2), by a second melt bonded section-forming device 134, described below. Two second melt bonded sections 11, melt bonding the substrate sheet 12, holding sheet 13 and first fibrous member 3 and extending in the lengthwise direction, are formed in the cleaning member 1. The two second melt bonded sections 11 are each formed intermittently. The melt bonding of the first fibrous member 3 with the substrate sheet 12 and the holding sheet 13 causes the first fibrous member 3 to track movement of the sheets 12 and 13, so that the brush sheet 2 is more easily widened during use. As a result, the brush sheet 2 more readily contacts dust, so that the dust is more easily taken up and captured and cleaning efficiency is consequently improved.

The substrate sheet 12 and the holding sheet 13 are melt bonded at the first melt bonded section 8 with all layers of the brush sheet 2 (the first fibrous member 3, second fibrous member 4, third fibrous member 5, fourth fibrous member 6 and sheet with slits 7), while also being melt bonded with the first fibrous member 3 of the brush sheet 2 at the two second melt bonded sections 11.

This forms, between the substrate sheet 12 and the holding sheet 13, a pair of bag-shaped spaces which are defined by the first melt bonded section 8 and the two second melt bonded sections 11 and extending in the lengthwise direction of the substrate sheet 12 and the holding sheet 13, with both ends in the lengthwise direction being open, and these spaces serve as the pair of receiving parts 14. Consequently, the insert parts 16 of the handle 15 can be inserted into the bag interiors of the pair of receiving parts 14.

The substrate sheet 12 and holding sheet 13 are melt bonded with the first fibrous member 3 of the brush sheet 2 at their centers, by a second melt bonded section-forming device 134 which is described below. In other words, as shown in FIG. 3, the cleaning member 1 has a pair of melt bonding lines 18 formed at a predetermined interval in the widthwise directions of the substrate sheet 12 and the holding sheet 13, the first melt bonded section 8 being formed between the pair of melt bonding lines 18. The pair of melt bonding lines 18 are marks for managing the position of the first melt bonded section 8 during the production stage, and determining whether or not the first melt bonded section 8 is arranged between the pair of melt bonding lines 18, using a sensor or the like, allows discrimination between good products and bad products.

As shown in FIG. 1 to FIG. 3, the two second melt bonded sections 11 are provided intermittently at several locations in the lengthwise directions of the substrate sheet 12 and the holding sheet 13, and a plurality of arc-shaped projections 16a provided on the outer sides of the insert parts 16 of the handle 15 are able to engage with non-melt bonded sections of the two second melt bonded sections 11. This prevents the insert parts 16 of the handle 15 from being pulled out from the receiving parts 14.

As shown in FIG. 1, both edge sections of the substrate sheet 12 and the holding sheet 13 in the widthwise direction (the outer sections of the two second melt bonded sections 11) are provided with sawtooth shaped slits 20a at predetermined intervals along the lengthwise direction, the slits 20a providing both edges with sawtooth shaped strips 20. As another embodiment, there may be mentioned an embodiment in which the substrate sheet 12 and the holding sheet 13 are not provided with sawtooth shaped slits 20a, and therefore the strips 20 are not provided.

As shown in FIG. 1, the handle 15 has a pair of rectangular plate-shaped insert parts 16 arranged parallel to each other, a pair of arc-shaped projections 16a which protrude out from the sides on the outside surfaces at both edges in the widthwise directions of each of the insert parts 16, and a holder 17 which is provided integrally with one of the ends of the insert parts 16 and is formed from plastic, for example.

The cleaning member 1 is attached to the handle 15 by inserting the two insert parts 16 of the handle 15 inside the two receiving parts 14 of the cleaning member 1 and engaging the projections 16a with non-melt bonded sections of the two second melt bonded sections 11. Further, by holding the holder 17 of the handle 15, bringing the brush sheet 2 into contact with the location to be cleaned and making it move in the desired direction, the dust, dirt, etc. of the location to be cleaned is trapped by the brush sheet 2, so that the location to be cleaned is cleaned.

The cleaning member shown in FIG. 1 to FIG. 3 is an example of a cleaning member which can be produced using a method and system for producing a cleaning member according to the invention, and the method and system for producing a cleaning member according to the present invention can be used to produce a cleaning member as set forth in, for example, Japanese Patent No. 2000-296083 A1, No. 2003-265390 A1, No. 2003-268663 A1, No. 2004-223692 A1, No. 2005-046645 A1, No. 2005-095665 A1, No. 2005-111284 A1, No. 2005-137929 A1, No. 2005-137930 A1, No. 2005-137931 A1, No. 2005-144198 A1, No. 2005-169148 A1, No. 2005-199077 A1, No. 2005-230573 A1, No. 2005-237975 A1, No. 2006-015164 A1, No. 2006-034990 A1, No. 2006-141483 A1, No. 2007-135774 A1, No. 2007-209460 A1 and No. 2007-209461 A1, and No. 2007-029136 A1, No. 2007-111297 A1, No. 2007-135666 A1, No. 2007-136156 A1, No. 2007-159612 A1, No. 2007-236690 A1, No. 2008-006260 A1, No. 2008-119171 A1 and No. 2007-029135 A1, the entire disclosures of which are incorporated herein by reference.

The method of producing a cleaning member and the system for producing a cleaning member according to the present invention can be used to produce a cleaning member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, the entire disclosures of which are incorporated herein by reference.

An embodiment of the method and apparatus of producing the cleaning member 1 will now be explained based on FIG. 4.

Figure 4:
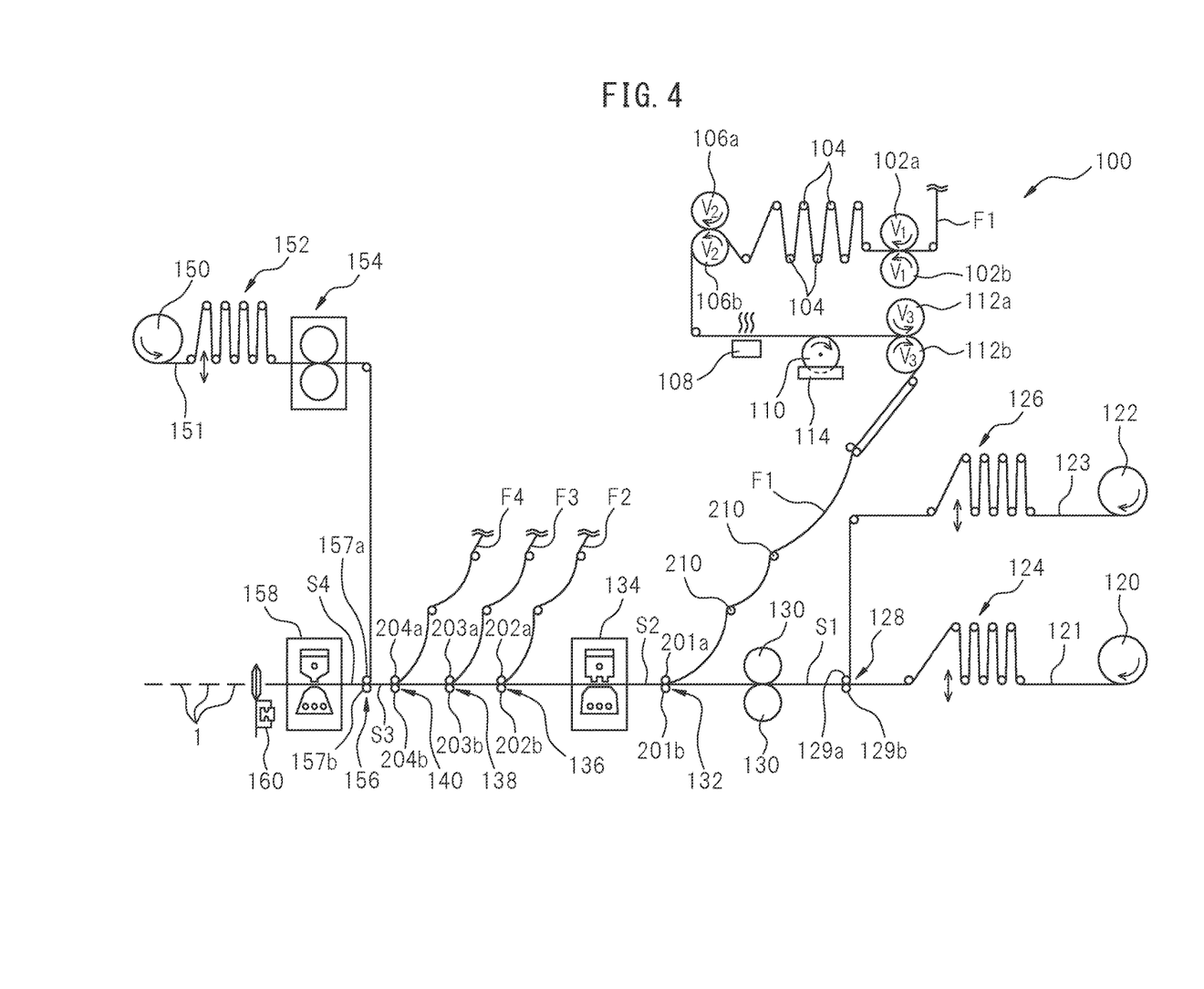
FIG. 4 is a schematic view illustrating a production method and/or production system for the cleaning member shown in FIG. 1.

FIG. 4 is a schematic view illustrating the method and apparatus of producing the cleaning member 1, and in this embodiment, the apparatus 100 shown in FIG. 4 is used to carry out the method of producing the cleaning member 1.

In the present embodiment, the method of production of the cleaning member 1 includes the following Step 1 and Step 2.

[Step 1] A step of opening the fiber bundles to a step of conveying them, and a step of conveying the belt-shaped nonwoven fabric.

[Step 2] A step of using the fiber bundles to produce a multilayer web and cutting out the cleaning member 1 from the multilayer web.

<Step 1>

Step 1 will now be explained.

In the present embodiment, Step 1 includes the following Step 1a and Step 1b.

[Step 1a] A step of opening the first fiber bundle F1 to fourth fiber bundle F4.

[Step 1b] A fiber bundle transport step in which the first fiber bundle F1 to fourth fiber bundle F4 are conveyed.

[Step 1c] A nonwoven fabric conveying step in which the belt-shaped nonwoven fabrics 121, 123 are conveyed toward the merging section with the fiber bundle F1.

In the present embodiment, Step 1 includes Step 1a, but the presence or absence of Step 1a may be selected as appropriate in accordance with the type of fiber bundles used. As another embodiment there may be mentioned an embodiment in which Step 1a is omitted. For example, Step 1a may be omitted when the fiber bundles are comprised of non-crimped fibers.

[Step 1a]

Step 1a will now be explained using the step of opening the first fiber bundle F1 as an example, but the steps of opening the other fiber bundles F2 to F4 are performed in a similar manner.

The first fiber bundle F1 which is comprised of crimped fibers is continuously pulled out from a storage container (not shown) and sent to first nip rolls 102a and 102b which rotate at a fixed peripheral velocity V1. After passing the first nip rolls 102a and 102b, the first fiber bundle F1 passes through a plurality of tension rolls 104 and is sent to second nip rolls 106a and 106b which rotate at a peripheral velocity V2.

The peripheral velocity V2 of the second nip rolls 106a and 106b is faster than the peripheral velocity V1 of the first nip rolls 102a and 102b. Tension acts on the first fiber bundle F1 due to the difference in peripheral velocities between the first nip rolls 102a and 102b and the second nip rolls 106a and 106b, and the first fiber bundle F1 is opened as a result.

Each of the tension rolls 104, for example, are formed from solid steel and have their mass adjusted so that a considerable degree of force is required to rotate them. Therefore, while the first fiber bundle F1 is rotating the tension rolls 104 and advancing from the first nip rolls 102a and 102b toward the second nip rolls 106a and 106b, any rapid increase in the rotational speed of the tension roll 104 is minimized, and the traveling speed of the first fiber bundle F1 does not rapidly increase.

The tension rolls 104 are arranged so as to be able to gradually open the first fiber bundle F1 and so that the distance between the first nip rolls 102a and 102b and the second nip rolls 106a and 106b is lengthened.

The first fiber bundle F1 that has passed through the second nip rolls 106a and 106b passes through an air feeder 108 and is sent to third nip rolls 112a and 112b which rotate at a peripheral velocity V3. The peripheral velocity V3 of the third nip rolls 112a and 112b is slower than the peripheral velocity V2 of the second nip rolls 106a and 106b. Due to this difference in peripheral velocities, the tension of the first fiber bundle F1 is more relaxed between the second nip rolls 106a and 106b and the third nip rolls 112a and 112b than between the first nip rolls 102a and 102b and the second nip rolls 106a and 106b, and as a result the first fiber bundle F1 is further opened and the width of the first fiber bundle F1 is expanded.

The first fiber bundle F1 which is sent to the second nip rolls 106a and 106b to the third nip rolls 112a and 112b is blown with air from the air feeder 108, and as a result the first fiber bundle F1 is further opened.

In the present embodiment, the first fiber bundle F1 is opened by applying and relaxing tension and by blowing air, but the opening method may be changed as appropriate. As another embodiment there may be mentioned an embodiment employing either application and relaxation of tension or blowing of air, and as another embodiment there may be mentioned an embodiment in which application and relaxation of tension and blowing of air are combined with the use of another opening method.

Furthermore, while the first to third nip rolls are used for application and relaxation of tension for the present embodiment, the number of nip rolls can be changed as appropriate. As another embodiment there may be mentioned an embodiment in which other nip rolls are used in addition to the first to third nip rolls for application and relaxation of tension.

An oil tank 114 is provided further downstream in the machine direction from the location of the air feeder 108 between the second nip rolls 106a and 106b and the third nip rolls 112a and 112b, and a transfer roll 110 is used to transfer and coat the oil in the oil tank 114 onto the first fiber bundle F1 onto which air has been blown by the air feeder 108.

In the present embodiment, the oil contained in the oil tank 114 is a dust-catching oil which has the action of promoting adsorption of dust, dirt and the like (for example, oil mainly comprised of liquid paraffin).

Transfer and coating of the oil by the oil tank 114 is not absolutely necessary.

[Step 1b]

Step 1b will now be explained using the fiber bundle conveying step for the first fiber bundle F1 as an example, but the conveying step for other fiber bundles F2 to F4 are performed in a similar manner.

For the fiber bundle conveying step there is employed a fiber bundle conveying apparatus having the third nip rolls 112a and 112b and the pair of fourth nip rolls 201a and 201b, which are the merging section 132 described below, and a transport roll provided at a predetermined interval between the third and fourth nip rolls. In addition, the first fiber bundle F1 is conveyed from the third nip rolls 112a and 112b, across the transport roll toward the fourth nip rolls 201a and 201b which are the merging section 132.

During this time, the first fiber bundle F1 is conveyed in a relaxed state between the third nip rolls 112a and 112b and the fourth nip rolls 201a and 201b. Furthermore, the transport roll 210 conveys the first fiber bundle F1 while supporting the relaxed portion. Relaxation of the first fiber bundle is accomplished by delivering the first fiber bundle F1 beforehand from the third nip rolls 112a and 112b, to a longer extent than the distance between the third nip rolls 112a and 112b and the fourth nip rolls 201a and 201b. Also, by adjusting the rotational speed and the timing of rotation between the third nip rolls 112a and 112b and the fourth nip rolls 201a and 201b, a constant state of relaxation can be maintained in the first fiber bundle F1.

Furthermore, when it passes through the third nip rolls 112a and 112b, the first fiber bundle F1 does not subsequently pass through nip rolls or tension rolls up to the merging section 132.

In the fiber bundle conveying step, therefore, the first fiber bundle F1 is only subjected to its own weight and the minimal degree of tension required for conveying, and no tension is applied that would cause opening to advance, such as tension from between the first nip rolls 102a and 102b to the third nip rolls 112a and 112b. In the fiber bundle conveying step, therefore, there is no narrowing of the first fiber bundle F1 due to tension and minimal advancement of opening.

Furthermore, the first fiber bundle F1 is conveyed to the merging section 132, while the second to fourth fiber bundles F2 to F4 are respectively conveyed to the merging sections 136, 138 and 140, after having completed step 1b.

[Step 1c]

In step 1c, the belt-shaped nonwoven fabrics 121 and 123 that are to be overlaid at the merging section with the fiber bundle that has completed step 1b, are conveyed toward the merging section.

The belt-shaped nonwoven fabrics 121 and 123 correspond to the substrate sheet 12 of the cleaning member 1 and the holding sheet 13, respectively, and as explained below, they are conveyed to the merging point 132 as a multilayer web S1 formed by overlaying of the belt-shaped nonwoven fabrics.

The belt-shaped nonwoven fabric 121 is continuously unrolled from a nonwoven fabric roll 120 and is intermittently conveyed by being passed through dancer rolls 124 which include a plurality of rolls arranged in upper and lower levels, the rolls positioned on the lower level rocking up and down. Similarly, the belt-shaped nonwoven fabric 123 is continuously unrolled from a nonwoven fabric roll 122 and is intermittently conveyed by being passed through dancer rolls 126 which include a plurality of rolls arranged in upper and lower levels, the rolls positioned on the lower level rocking up and down. The term "intermittently conveyed" means that the belt-shaped nonwoven fabrics 121 and 123 are repeatedly advanced by just a fixed distance (for example, substantially the widthwise direction length of the cleaning member 1) in the machine direction, and then conveying is halted for a fixed time. By having the belt-shaped nonwoven fabrics 121 and 123 intermittently conveyed in this way, it is possible to ensure a multilayer web halting time necessary for melt bonding of the constituent elements of the multilayer web in the joining step, described below.

The belt-shaped nonwoven fabrics 121 and 123 maintain a constant tension, while at a merging section 128, a multilayer web S1 comprised of two belt-shaped nonwoven fabrics is formed by a pair of belt-shaped nonwoven fabric nip rolls 129a and 129b, the multilayer web S1 passing through gather cutters 130 at the surfaces of which sawtooth shaped blades (not shown) are intermittently formed in the peripheral direction. This forms slits which correspond to the slits 20a of the substrate sheet 12 and holding sheet 13 (see FIG. 1). Further, the multilayer web S1 advances to the merging section 132 while maintaining a constant tension.

<Step 2>

Step 2 will now be explained.

In the present embodiment, Step 2 includes the following Step 2a to Step 2c.

[Step 2a] A multilayer web forming step, wherein the fiber bundle from Step 1b is overlaid on the belt-shaped nonwoven fabric to form a multilayer web.

[Step 2b] A joining step, wherein the fiber bundle and belt-shaped nonwoven fabric in the multilayer web are joined.

[Step 2c] A cutting step, wherein the multilayer web is cut in the widthwise direction, and individual cleaning members 1 are cut out from the multilayer web.

[Step 2a]

Step 2a will now be explained.

In the present embodiment, the fiber bundle from Step 1b and the belt-shaped nonwoven fabrics 121 and 123 are overlaid. As another embodiment there may be mentioned an embodiment in which one or two of the belt-shaped nonwoven fabrics is overlaid with fiber bundles from Step 1b, and as yet another embodiment there may be mentioned an embodiment in which, in addition to the belt-shaped nonwoven fabrics, another belt-shaped nonwoven fabric is overlaid with a fiber bundle from Step 1b. The order of lamination is not particularly limited for any of the embodiments, but the belt-shaped nonwoven fabric is preferably positioned at the outermost layer by the lamination.

The belt-shaped nonwoven fabrics 121 and 123 respectively correspond to the substrate sheet 12 and holding sheet 13 of the cleaning member 1. The belt-shaped nonwoven fabric 121 is continuously unrolled from a nonwoven fabric roll 120 and is intermittently conveyed by being passed through dancer rolls 124 which include a plurality of rolls arranged in upper and lower levels, the rolls on the lower level rocking up and down. Similarly, the belt-shaped nonwoven fabric 123 is continuously unrolled from a nonwoven fabric roll 122 and is intermittently conveyed by being passed through dancer rolls 126 which include a plurality of rolls arranged in upper and lower levels, the rolls positioned on the lower level rocking up and down. The term "intermittently conveyed" means that the belt-shaped nonwoven fabrics 121 and 123 are repeatedly advanced by just a fixed distance (for example, substantially the widthwise direction length of the cleaning member 1) in the machine direction, and then conveying is stopped for a fixed time. By having the belt-shaped nonwoven fabrics 121 and 123 intermittently conveyed in this way, it is possible to ensure a time necessary for melt bonding of the constituent elements of the multilayer web, as described below.

The belt-shaped nonwoven fabrics 121 and 123 maintain a constant tension, while at a merging section 128, a multilayer web S1 comprised of two belt-shaped nonwoven fabrics is formed by a pair of nip rolls, the multilayer web S1 passing through gather cutters 130 at the surfaces of which sawtooth shaped blades (not shown) are intermittently formed in the peripheral direction. This forms slits which correspond to the slits 20a of the substrate sheet 12 and holding sheet 13 (see FIG. 1). Further, the multilayer web S1 advances to the merging section 132 while maintaining a constant tension.

At the merging section 132, the multilayer web S1 merges with the first fiber bundle F1 from step 1, which has no tension applied. A multilayer web S2 is formed by overlaying of the multilayer web S1 and the first fiber bundle F1. During this time, the multilayer web forming apparatus that is to form the multilayer web S2 consists of fourth nip rolls 201a and 201b that are to overlay the multilayer belt-shaped nonwoven fabric, as the multilayer web S1, and the first fiber bundle F1, with the location between the fourth nip rolls 201a and 201b essentially serving as the merging point 132.

Figure 5:
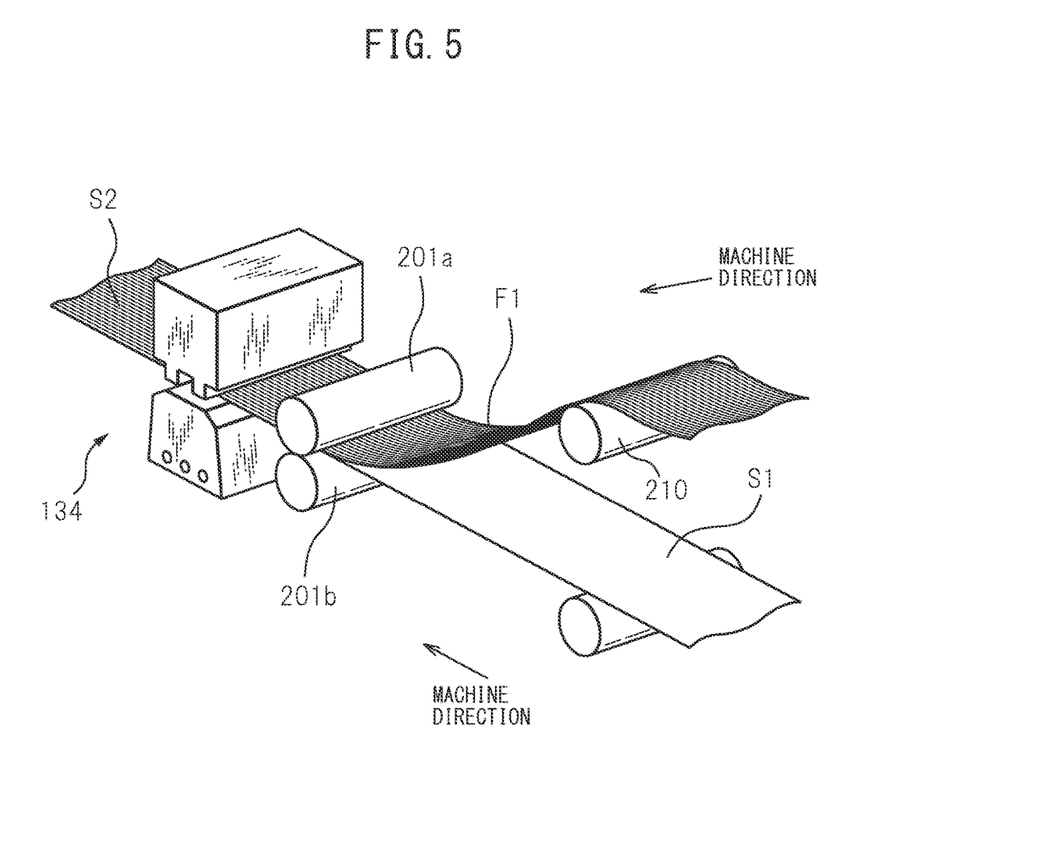
FIG. 5 is a perspective view illustrating the multilayer web forming step of the production method of the invention.

FIG. 5 shows the state during the multilayer web forming step in which the first fiber bundle F1 conveyed by the fiber bundle conveying step, and the multilayer web S1 formed by the belt-shaped nonwoven fabrics 121 and 123 and conveyed by the nonwoven fabric conveying step, are overlaid to form the multilayer web S2.

As shown in FIG. 5, the first fiber bundle F1 conveyed by the fiber bundle conveying step is conveyed in a state with a certain degree of relaxation, upstream from the fourth nip rolls 201a and 201b which constitute the merging point 132, i.e. before formation of the multilayer web S2. On the other hand, the multilayer web S1 (belt-shaped nonwoven fabric) conveyed by the nonwoven fabric conveying step is conveyed to the merging point 132 in a state subjected to a degree of tension such that it is not relaxed but also does not narrow.

In addition, while relaxation of the fiber bundle is terminated after the multilayer web S2 has been formed by overlaying the first fiber bundle F1 and the multilayer web S1 with the fourth nip rolls 201a and 201b, the tension acting on the fiber bundle is still kept to a degree such that it does not narrow. Moreover, the multilayer web S1 is also kept to a degree such that it does not narrow.

Therefore, the multilayer web S2 comprised of the first fiber bundle F1 and the multilayer web S1 is conveyed to the second melt bonded section-forming device 134, which is the apparatus for the subsequent joining step, under the action of a degree of tension such that it does not narrow as a whole.

Thus, since a degree of tension is constantly maintained by slack so that narrowing does not take place, and the degree of tension that avoids narrowing is maintained even after the multilayer web S2 has been formed, opening of the first fiber bundle F1 is minimized, not only before formation of the multilayer web S2, naturally, but also during and after its formation, thus facilitating control of the length of the first fiber bundle F1. Furthermore, even if the first fiber bundle F1 has been pulled toward the second melt bonded section-forming device 134 that is used in the joining step described below, there is minimal action of any large tension that would act to advance opening by the extent of the slack.

On the other hand, during melt bonding of the first fiber bundle F1 and the belt-shaped nonwoven fabric (multilayer web S1), that are to form the multilayer web S2 in the joining step, conveyance of the multilayer web S2 is temporarily halted to ensure the melt bonding time, which also temporarily halts conveyance of the first fiber bundle F1, but since there is no problem even if slackening of the first fiber bundle is produced by halting of the conveyance, the halting time may be adequately ensured. It is thus possible to ensure the time required for joining, while maintaining a degree of tension such that narrowing does not take place.

At the merging sections 136, 138, and 140, the multilayer web S2 successively merges with the second fiber bundle F2 to fourth fiber bundle F4 passing through Step 1, whereby the second fiber bundle F2 to fourth fiber bundle F4 are successively overlaid on the multilayer web S2 and the multilayer web S3 is formed.

Incidentally, at the merging sections 136, 138 and 140, as shown in FIG. 4, the pair of nip rolls 202a, 202b, 203a, 203b, 204a and 202b serving as the multilayer web forming apparatus successively overlay the second fiber bundle F2 to fourth fiber bundle F4 to the multilayer web S2, forming a multilayer web S3.

After the multilayer web S3 has been formed, separately from the aforementioned belt-shaped nonwoven fabrics 121 and 123, the belt-shaped nonwoven fabric 151 corresponding to the sheet with slits 7 of the cleaning member 1 is overlaid with the multilayer web S3 at the merging section 156, forming a multilayer web S4.

In the nonwoven fabric conveying step for the belt-shaped nonwoven fabric 151, the belt-shaped nonwoven fabric 151 is conveyed by the nonwoven fabric transport apparatus that is formed by different rolls. That is, in the nonwoven fabric conveying step for the belt-shaped nonwoven fabric 151, it is continuously unrolled from the nonwoven fabric roll 150, intermittently conveyed by passing through a dancer roll 152, and then passed through a gather cutter 154. The gather cutter 154 has sawtooth-shaped blades (not shown) that are continuous in the peripheral direction of the surface, whereby sawtooth-shaped slits (not shown) are formed in the belt-shaped nonwoven fabric 151 that has passed through the gather cutter 154.

Also, the belt-shaped nonwoven fabric 151 merges with the multilayer web S3 at the merging section 156, the belt-shaped nonwoven fabric 151 being laid over the multilayer web S3 by a pair of nip rolls, thereby forming the multilayer web S4.

[Step 2b]

Step 2b will now be explained.

The multilayer web S2 passes through the second melt bonded section-forming device 134, which is the joining apparatus to be used in the joining step, before the second fiber bundle F2 to fourth fiber bundle F4 merge. The second melt bonded section-forming device 134 melt bonds the belt-shaped nonwoven fabrics 121 and 123 and the first fiber bundle F1 which are contained in the multilayer web S2, forming two second melt bonded sections 11 (see FIG. 3). This causes the multilayer web S2 to be melt bonded across its thickness direction. In the present embodiment, a heat seal device is used as the second melt bonded section-forming device 134, but another sealing device (for example, an ultrasonic sealing device or the like) may be used instead.

The multilayer web S4 passes through the first melt bonded section-forming device 158, which is the joining apparatus. The first melt bonded section-forming device 158 melt bonds the multilayer web S4 as a whole and forms a first melt bonded section 8 in the multilayer web S4 (see FIG. 3 etc.). This causes the multilayer web S4 to be melt bonded across the thickness direction. In the present embodiment, a heat seal device is used as the first melt bonded section-forming device 154, but the melt bonded section-forming device may be changed as appropriate. As another embodiment there may be mentioned an embodiment in which an ultrasonic sealing device is used.

[Step 2c]

Step 2c will now be explained.

The multilayer web S4 that has passed through the first melt bonded section-forming device 158 is cut in the widthwise direction of the multilayer web S4 by a cutting device 160 provided with a cutter, whereby individual cleaning members 1 are cut out.

The cleaning member 1 produced by the present embodiment includes a sheet with slits 7, but a cleaning member produced by another embodiment does not contain the sheet with slits 7. Further, in the cleaning member 1 produced by the present embodiment, the receiving parts 14 are positioned on the surface of the cleaning member 1, but in a cleaning member produced by another embodiment, the order of lamination of the substrate sheet 12 and the holding sheet 13 and the fibrous members 3 to 6 is changed so that the receiving parts 14 are arranged between any adjoining fibrous members 3 to 6. This allows both surfaces of the cleaning member 1 to be used for cleaning. During this time, in order to facilitate insertion of the insert parts 16 into the receiving parts 14, the dimensions of the substrate sheet 12 and the holding sheet 13 in the lengthwise direction (the up-down direction in FIG. 3) are preferably made longer than the fibrous members 3 to 6, but these dimensions may be arbitrarily determined. Moreover, it is not necessary to use a sheet with slits 7 during this time, or sheets with slits 7 may be arranged on both surfaces of the cleaning member 1.

The present application claims the benefit of the following patent applications, the entire disclosures of which are incorporated herein by reference.

(1) JP Patent Application No. 2012-289181 filed in Japan on Dec. 29, 2012, and the US patent application claiming priority thereof, namely U.S. patent application Ser. No. 13/749,721.

(2) JP Patent Application No. 2012-289182 filed in Japan on Dec. 29, 2012, and the US patent application claiming priority thereof, namely U.S. patent application Ser. No. 13/749,719.

(3) JP Patent Application No. 2012-289174 filed in Japan on Dec. 29, 2012, and the US patent application claiming priority thereof, namely U.S. patent application Ser. No. 13/749,716.

(4) JP Patent Application No. 2012-289189 filed in Japan on Dec. 29, 2012, and the US patent application claiming priority thereof, namely U.S. patent application Ser. No. 13/749,724.

(5) JP Patent Application No. 2012-289175 filed in Japan on Dec. 29, 2012, and the US patent application claiming priority thereof, namely U.S. patent application Ser. No. 13/749,723.

(6) JP Patent Application No. 2012-289188 filed in Japan on Dec. 29, 2012, and the US patent application claiming priority thereof, namely U.S. patent application Ser. No. 13/749,722.

(7) JP Patent Application No. 2012-289179 filed in Japan on Dec. 29, 2012, and the US patent application claiming priority thereof, namely U.S. patent application Ser. No. 13/749,726.

(8) JP Patent Application No. 2012-289177 filed in Japan on Dec. 29, 2012, and the US patent application claiming priority thereof, namely U.S. patent application Ser. No. 13/749,718.

(9) JP Patent Application No. 2012-289184 filed in Japan on Dec. 29, 2012, and the US patent application claiming priority thereof, namely U.S. patent application Ser. No. 13/749,725.

(10) JP Patent Application No. 2012-289178 filed in Japan on Dec. 29, 2012, and the US patent application claiming priority thereof, namely U.S. patent application Ser. No. 13/749,714.

(11) JP Patent Application No. 2012-289176 filed in Japan on Dec. 29, 2012, and the US patent application claiming priority thereof, namely U.S. patent application Ser. No. 13/749,713.

(12) JP Patent Application No. 2013-002855 filed in Japan on Jan. 10, 2013, and the US patent application claiming priority thereof, namely U.S. patent application Ser. No. 13/749,717.

(13) JP Patent Application No. 2013-002857 filed in Japan on Jan. 10, 2013, and the US patent application claiming priority thereof, namely U.S. patent application Ser. No. 13/749,715.

REFERENCE SIGNS LIST

1 Cleaning member
2 Brush sheet
3 First fibrous member
4 Second fibrous member
5 Third fibrous member
6 Fourth fibrous member
7 Sheet with slits
8 First melt bonded section
11 Second melt bonded section
12 Substrate sheet
13 Holding sheet
14 Receiving part
15 Handle
16 Insert part
16a Projection
17 Holder
18 Melt bond line
20 Strip
20a Slit
100 Cleaning member production apparatus
102a, b First nip rolls
104 Tension roll
106a, b Second nip rolls
108 Air feeder
110 Transfer roll
112a, b Third nip rolls
114 Oil tank
120, 122, 150 Nonwoven fabric rolls
121, 123, 151 Belt-shaped nonwoven fabrics
124, 126, 152 Dancer rolls
128, 132, 136, 138, 140, 156 Merging sections
130, 154 Gather cutters
134 Second melt bonded section-forming device
158 First melt bonded section-forming device
160 Cutting device

The invention claimed is:

1. A method of producing a cleaning member that is obtained from a multilayer web formed by overlaying a fiber bundle and a belt-shaped nonwoven fabric, the method comprising:
    a fiber bundle opening step in which the fiber bundle is opened by repeating application of tension and relaxation on the fiber bundle in the machine direction,
    a fiber bundle conveying step in which the opened fiber bundle is conveyed while relaxing, in a machine direction, toward a merging section where the fiber bundle is to be overlaid with the belt-shaped nonwoven fabric,
    a nonwoven fabric conveying step in which the belt-shaped nonwoven fabric is conveyed toward the merging section,
    a multilayer web forming step in which the opened fiber bundle that has been conveyed in the fiber bundle conveying step and the belt-shaped nonwoven fabric that has been conveyed in the nonwoven fabric conveying step are overlaid at the merging section to form a multilayer web, and
    a joining step in which the opened fiber bundle and the belt-shaped nonwoven fabric in the multilayer web are mutually joined,
    wherein
    in the fiber bundle conveying step, the opened fiber bundle is conveyed with a degree of tension such that the fiber bundle maintains a constant width in a widthwise direction crossing the machine direction to prevent the fiber bundles from shrinking when the tension is released after the joining step, and
    in the multilayer web forming step, the multilayer web is formed by overlaying the opened fiber bundle with the belt-shaped nonwoven fabric in a state of tension acting on the fiber bundle to such a degree that the fiber bundle maintains the constant width in the widthwise direction.

2. The method according to claim 1, wherein, in the fiber bundle conveying step, the opened fiber bundle is conveyed in a straight line.

3. The method according to claim 1, wherein, in the nonwoven fabric conveying step, the belt-shaped nonwoven fabric is conveyed in a straight line.

4. The method according to claim 1, wherein, in the nonwoven fabric conveying step, the belt-shaped nonwoven fabric is conveyed while a width of the belt-shaped nonwoven fabric is maintained constant in the widthwise direction.

5. The method according to claim 1, wherein, in the joining step, the opened fiber bundle and the belt-shaped nonwoven fabric are joined together by melt bonding.

6. The method according to claim 1, further comprising:
    a cutting step in which the multilayer web is cut in the widthwise direction, wherein the cutting step is carried out after the joining step.

7. The method according to claim 1, further comprising:
    providing
    a fiber bundle conveying apparatus that continuously conveys the opened fiber bundle, in the machine direction, toward the merging section where the opened fiber bundle is to be overlaid with the belt-shaped nonwoven fabric, a nonwoven fabric conveying apparatus that continuously conveys the belt-shaped nonwoven fabric toward the merging section, a multilayer web forming apparatus that overlays the opened fiber bundle that has been conveyed by the fiber bundle conveying apparatus and the belt-shaped nonwoven fabric that has been conveyed by the nonwoven fabric conveying apparatus at the merging section to form a multilayer web, and a joining apparatus that mutually joins the opened fiber bundle and the belt-shaped nonwoven fabric in the multilayer web.

8. The method according to claim 7, wherein the fiber bundle conveying apparatus conveys the opened fiber bundle while relaxing the fiber bundle in the machine direction.

9. The method according to claim 7, wherein a cutting device that cuts the multilayer web in the widthwise direction is further provided.

10. The method according to claim 1, wherein in the fiber bundle conveying step, the opened fiber bundle, is conveyed while maintaining the constant width, toward the merging section where the opened fiber bundle is to be overlaid with the belt-shaped nonwoven fabric.

11. The method according to claim 1, wherein in the fiber bundle opening step, the fiber bundle is opened by being conveyed passing through a plurality of nip rolls, in the fiber bundle conveying step, the opened fiber bundle is conveyed, by a plurality of transport rolls downstream of the plurality of nip rolls in the machine direction, and the opened fiber bundle maintains the constant width while being conveyed from the plurality of nip rolls, to the plurality of transport rolls, then to the merging section where the opened fiber bundle is to be overlaid with the belt-shaped nonwoven fabric.

* * * * *